United States Patent
Kim (10) Patent No.: US 6,703,811 B2
(45) Date of Patent: Mar. 9, 2004

(54) APPARATUS AND METHOD FOR MANAGING BATTERY RECHARGING AND DISCHARGING AND RECHARGING OPERATIONS

(75) Inventor: Gwang Su Kim, Chun cheong buk do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/354,992

(22) Filed: Jan. 31, 2003

(65) Prior Publication Data

US 2003/0117114 A1 Jun. 26, 2003

Related U.S. Application Data (63) Continuation of application No. 09/725,475, filed on Nov. 30, 2001, now Pat. No. 6,583,604.

(30) Foreign Application Priority Data

Nov. 30, 1999 (KR) ........................................ 1999-53942

(51) Int. Cl.[7] .......................... H02J 7/16; G01N 29/416
(52) U.S. Cl. ...................................... 320/162; 324/428
(58) Field of Search ................................ 320/128, 130, 320/132, 133, 162; 324/426, 427, 428, 433

(56) References Cited

U.S. PATENT DOCUMENTS

| | | | | |
|---|---|---|---|---|
| 5,115,182 A | * | 5/1992 | Ehmke et al. | 320/136 |
| 5,136,620 A | | 8/1992 | Eaves | 320/134 |
| 5,563,493 A | | 10/1996 | Matsuda et al. | 320/124 |
| 5,617,008 A | * | 4/1997 | Eastmond et al. | 320/133 |
| 5,642,032 A | * | 6/1997 | Kokuga | 324/426 |
| 6,011,380 A | * | 1/2000 | Paryani et al. | 320/160 |
| 6,194,874 B1 | | 2/2001 | Kalogeropoulos et al. | 320/137 |

* cited by examiner

Primary Examiner—Pia Tibbits
(74) Attorney, Agent, or Firm—Fleshner & Kim, LLP (57) ABSTRACT

A battery capacity recovery apparatus performs discharging and/or recharging operations to increase the useful life of a battery. In one embodiment, the apparatus includes a control unit and a counter which counts a number of times the battery has been recharged. The control unit discharges the battery when a count value of the counter equals a predetermined reference value, and then a recharging operation is performed which involves recharging the battery at different recharge rates. In another embodiment, the control unit discharges the battery when a time detected by a time detection unit equals a control time. A two-rate recharging operation may then be performed.

24 Claims, 6 Drawing Sheets

APPARATUS AND METHOD FOR MANAGING BATTERY RECHARGING AND DISCHARGING AND RECHARGING OPERATIONS

CROSS-REFERENCE TO RELATED APPLICATIONS

This application is a continuation of U.S. patent application Ser. No. 09/725,475, filed on Nov. 30, 2000 U.S. Pat. No. 6,583,604, the contents of which are incorporated herein by reference.

BACKGROUND OF THE INVENTION

1. Field of the Invention

The present invention relates to a telecommunication system, and more particularly, a telecommunication device having a battery capacity recovery apparatus and method thereof.

2. Background of the Related Art

Generally, a wireless telephone, both cordless and mobile telephone, uses a radio link substituted for a cord typically used in landline telephones. A cordless telephone is appropriately used within a short-distance range, such as a room, and a mobile telephone is used within an intermediate or long distance range, especially when a user is at a remote location.

Figure 1A:
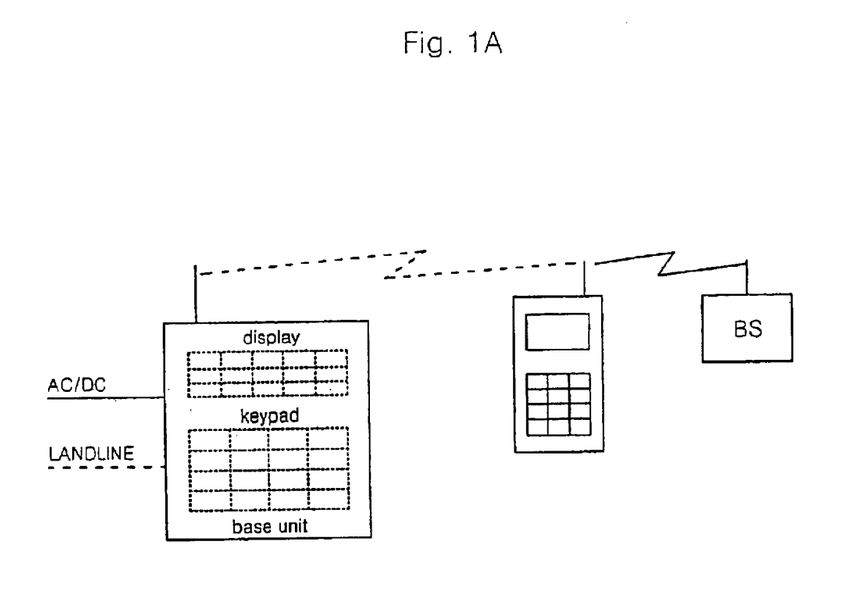
FIG. 1A is a block diagram of a cordless telephone system and a mobile telephone system.
Figure 1B:
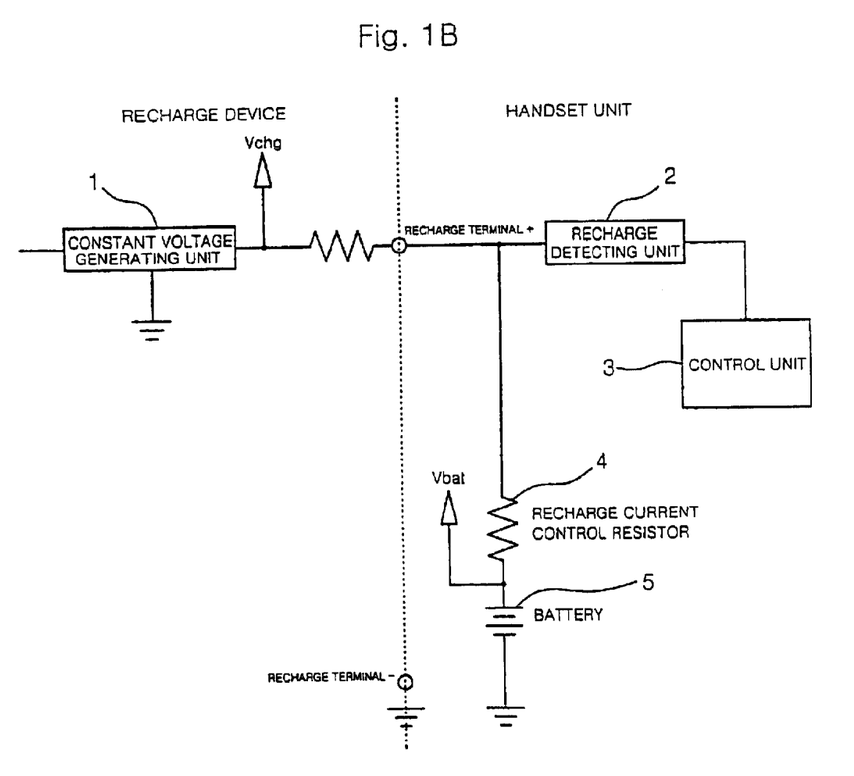
FIG. 1B is a block diagram illustrating the configuration of a conventional wireless telephone associated with a recharge device.

For such wireless telephones, one frequency or multiple frequencies may be used. As shown in FIG. 1A, if the telephone device is a cordless telephone, the handset communicates with a base unit, which includes a recharge receptacle and may include a keypad and a display, connected to a landline (dotted lines). Also, one or more handsets may be used for one base unit.

If the telephone device is a mobile telephone, the cell phone would communicate with a base station via a digital communication or an analog communication, and the base unit includes a recharge receptacle connected to an AC/DC converter. Further, one or more cellular phones would communicate with the base station.

In a conventional wireless telephone, the battery of the handset or the cellular telephone is temporarily used only when the user makes or receives a call. After the temporary use, the battery is rendered to be in a recharge state, if the telephone is placed in the recharge receptacle. Thus, discharge and recharge operations are repeatedly carried out for the battery.

FIG. 1A is a block diagram illustrating the configuration of a related art wireless telephone associated with a recharge device. In the related art wireless telephone, the base unit includes a constant voltage generating unit 1 incorporated in a recharge device.

The handset or the cellular phone includes (hereinafter, collectively referred to as handset unit) a recharge detecting unit 2 for detecting whether or not a handset unit is connected to the constant voltage generating unit 1 of the recharge device via recharge terminals, and a control unit 3 for determining whether or not the handset unit is connected to the recharge device, based on a detect signal outputted from the recharge detecting unit 2, and for controlling a recharge function of the handset unit based on the result of the determination, and a recharge current control resistor 4 is used to control a recharge current supplied to a battery 5 via the recharge terminals. The battery 5 is incorporated in the handset unit and recharged with a constant voltage supplied from the constant voltage generating unit 1.

Now, the charge operation of the related art wireless telephone having the above mentioned configuration will be described in detail. Where it is desired to recharge the battery 5 of the handset unit, the handset unit is first connected to the recharge terminals of the recharge device. In this state, the handset unit is connected to the constant voltage unit 1 of the recharge device, thereby causing a constant voltage to be supplied from the constant voltage unit 1 to the handset unit. A current is introduced into the battery 5 via the recharge current control resistor 4, thereby causing the battery 5 to be recharged with a constant voltage.

The recharge detecting unit 2 incorporated in the handset unit detects whether or not the handset unit is connected to the recharge device, and informs the control unit 3 of the detection result. When the control unit 3 determines, based on the information from the recharge detecting unit 2, that the handset unit is connected to the recharge device, it conducts a control for recharging the battery 5 with a constant voltage supplied from the constant voltage generating unit 1 of the recharge device.

However, the above mentioned related art wireless telephone has a problem associated with a "memory effect" of the battery 5 generated due to the habitual use pattern of the user associated with the use of the handset unit. For example, the user typically uses the handset of the cordless telephone after taking up the handset unit from a state in which the handset is laid on the recharge device (that is, a recharge state) of the base unit. During the use, the handset is in a discharge state. After the use of the handset, the user puts the handset on the recharge device of the base unit. Due to such a habitual use pattern of the user associated with the use of the handset, a memory effect is involved in the battery 5.

Users who have a technical knowledge about a memory effect on batteries may reduce, to some degree, the problem associated with the memory effect by appropriately controlling the use pattern for wireless telephones. However, most users repeat discharge and recharge operations for a battery without discharging the battery to a deep discharge state. For this reason, the battery has a capacity portion substantially unused. This capacity portion is gradually inactivated, so that it cannot be used. As a result, the battery has a reduced capacity corresponding to the capacity portion subjected to discharge and recharge operations. That is, a memory effect is generated. A similar effect occurs for mobile telephones when a user repeatedly recharges the battery without fully depleting the battery.

This memory effect results in a considerable reduction in the standby time or use time of the handset unit. The degradation resulting from such a memory effect occurs more frequently, as compared to those resulting from other factors.

SUMMARY OF THE INVENTION

An object of the invention is to solve at least the above problems and/or disadvantages and to provide at least the advantages described hereinafter.

An object of the invention is to provide a battery capacity recovery apparatus and method for periodically conducting discharge and recharge operations for a battery used in a wireless telephone to prevent a memory effect on the battery, thereby being capable of reducing the battery degradation while maximizing the convenience of the user.

In accordance with one aspect, the present invention provides in a system including a recharge device for recharging a battery, and an operating device adapted to use a voltage supplied from the battery, a battery capacity recovery apparatus comprising: a control unit for controlling the system; a voltage detecting unit for measuring a voltage condition of the battery, and outputting a signal indicative of the measured voltage condition to the control unit; a recharge detecting unit connected to a constant voltage unit included in the recharge device, the recharge detecting unit serving to detect whether or not the operating device is connected to the recharge device; and a recovery path establishing unit adapted to establish a path for recovering the capacity of the battery under a control of the control unit.

In accordance with another aspect, the present invention provides in a system including a recharge device for recharging a battery, and an operating device adapted to use a voltage supplied from the battery, a battery capacity recovery method comprising the steps of: setting a reference voltage for the battery; connecting the operating device to the recharge device; detecting a voltage of the battery; determining whether or not an operation for recovering the capacity of the battery is to be executed; determining whether or not the detected battery voltage is not less than the reference voltage; and executing a recharge or discharge operation, based on the results of the determinations.

The battery capacity recovery apparatus and method can prevent a memory effect more frequently resulting in a battery degradation, as compared to those resulting from other factors. Accordingly, it is possible to reduce the battery degradation while maximizing the convenience of the user.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2:
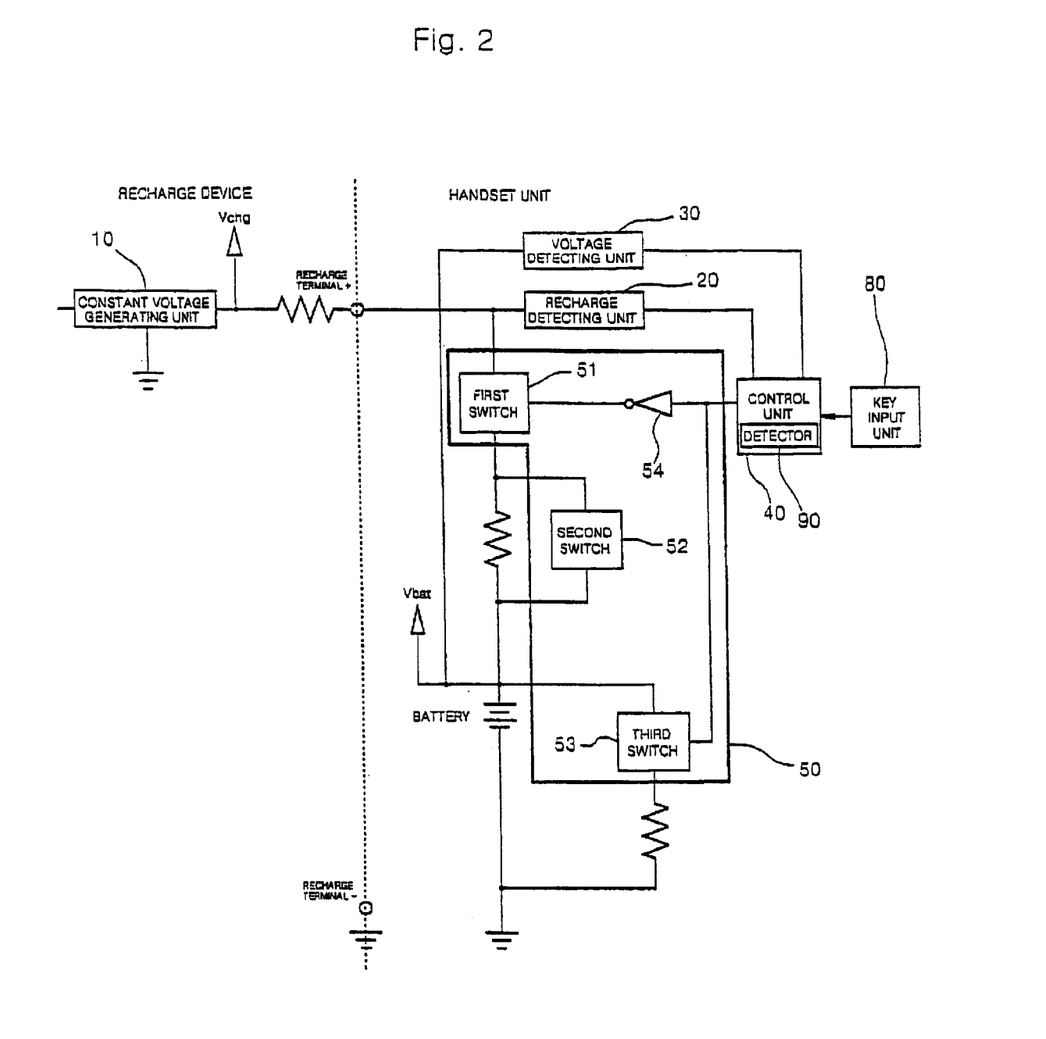
FIG. 2 is a block diagram illustrating a battery capacity recovery apparatus of a wireless telephone according to an embodiment of the present invention.

FIG. 2 is a block diagram illustrating a battery capacity recovery apparatus of a telecommunication device according to an embodiment of the present invention. A constant voltage generating unit 10 is incorporated in a recharge device installed in a base unit. A recharge detecting unit 20 for detecting whether or not a handset unit is connected to the constant voltage generating unit 1 of the recharge device via recharge terminals, i.e., whether or not the handset unit is in a recharge state.

A voltage detecting unit 30 measures the voltage condition of a battery incorporated in the handset unit, and informs a control unit 40 of the measured voltage condition. The control unit 40, which is included in the battery capacity recovery apparatus, controls a recovery path establishing unit 50, based on a signal received from the voltage detecting unit 30 and indicative of the measured voltage condition, while controlling the system of a telecommunication device to which the battery capacity recovery apparatus is applied.

The recovery path establishing unit 50, which is also included in the battery capacity recovery apparatus, establishes a path for recovering the battery under the control of the control unit 40. The recovery path establishing unit 50 includes a first switch 51 for establishing a recharge path between a recharge terminal and the battery via a recharge current control resistor under the control of the control unit 40. A second switch 52 establishes a recharge path between the first switch 51 and the battery under the control of the control unit 40 in order to allow a rapid recharge operation to be conducted, and a third switch 53 connects the battery to the ground under the control of the control unit 40, thereby establishing a forced discharge path.

The recovery path establishing unit 50 also includes an inverter 54 for controlling recharge and discharge operations to be conducted separately from each other under the control of the control unit 40. The inverter 54 receives a control signal from the control unit 40, and transmits a signal inverted from the received control signal to the first switch 51. By virtue of this function of the inverter 54, when a recharge operation is conducted in an ON state of the first switch 51, the third switch 53 is in its OFF state, thereby preventing a discharge operation from being conducted. In an OFF state of the first switch 51, the third switch 53 is in its ON state, so that the discharge operation is carried out.

Figure 3:
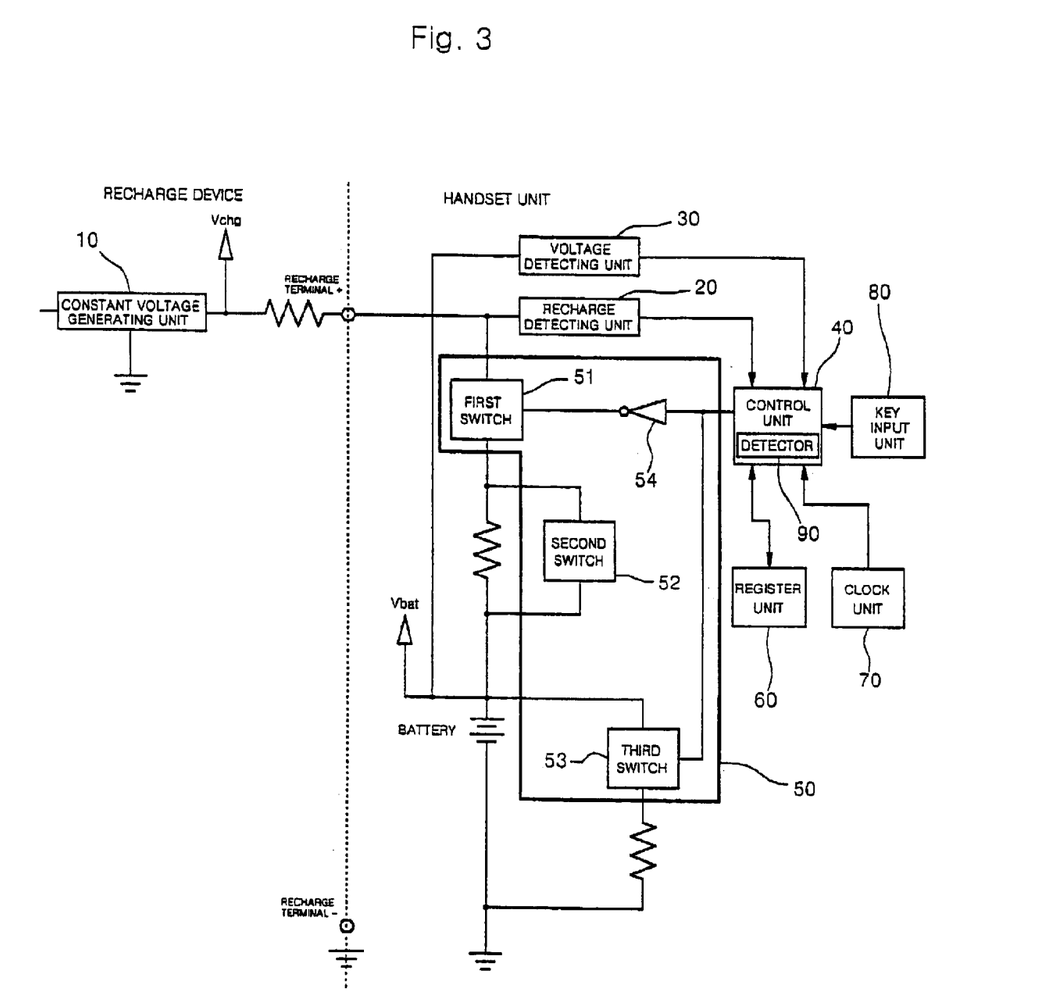
FIG. 3 is a block diagram illustrating a battery capacity recovery apparatus of a wireless telephone according to another embodiment of the present invention.

FIG. 3 is a block diagram illustrating a battery capacity recovery apparatus of a telecommunication device according to another embodiment of the present invention. In FIG. 3, elements respectively corresponding to those in FIG. 2 are denoted by the same reference numerals. A constant voltage generating unit 10 is incorporated in a recharge device installed in a base unit, a recharge detecting unit 20 detects whether or not a handset unit is connected to the constant voltage generating unit 1 of the recharge device via recharge terminals, i.e., whether or not the handset unit is in a recharge state, and a voltage detecting unit 30 for measuring the voltage condition of a battery incorporated in the handset unit, and informing a control unit 40 of the measured voltage condition.

The control unit 40, which is included in the battery capacity recovery apparatus, controls the recharge function of a wireless telephone, to which the battery capacity recovery apparatus is applied, based on the result of the measurement conducted by the recharge detecting unit 30. The control unit 40 also controls a recovery path establishing unit 50 and the system of the wireless telephone, based on a signal received from the voltage detecting unit 30 and indicative of the measured voltage condition.

The recovery path establishing unit 50, which is also included in the battery capacity recovery apparatus, establishes a path for recovering the battery under the control of the control unit 40. The battery capacity recovery apparatus further includes a register unit 60 for counting the number of detection times conducted by the recharge detecting unit 20. The register unit 60 also cumulatively stores the counted value, and a clock unit 70 generates a reference clock for a timing control of the control unit 40. A key input unit 80 is connected to the control unit 40 and adapted to input, to the control unit 40, key signals for setting an initial time and the current time.

The recovery path establishing unit 50 includes a first switch 51 for establishing a recharge path between a recharge terminal and the battery via a recharge current control resistor under the control of the control unit 40. A second switch 52 establishes a recharge path between the first switch 51 and the battery under the control of the control unit 40 in order to allow a rapid recharge operation to be conducted, and a third switch 53 connects the battery to the ground under the control of the control unit 40, thereby establishing a forced discharge path. The recovery path establishing unit 50 also includes an inverter 54 having the same function as that of FIG. 2.

Figure 4:
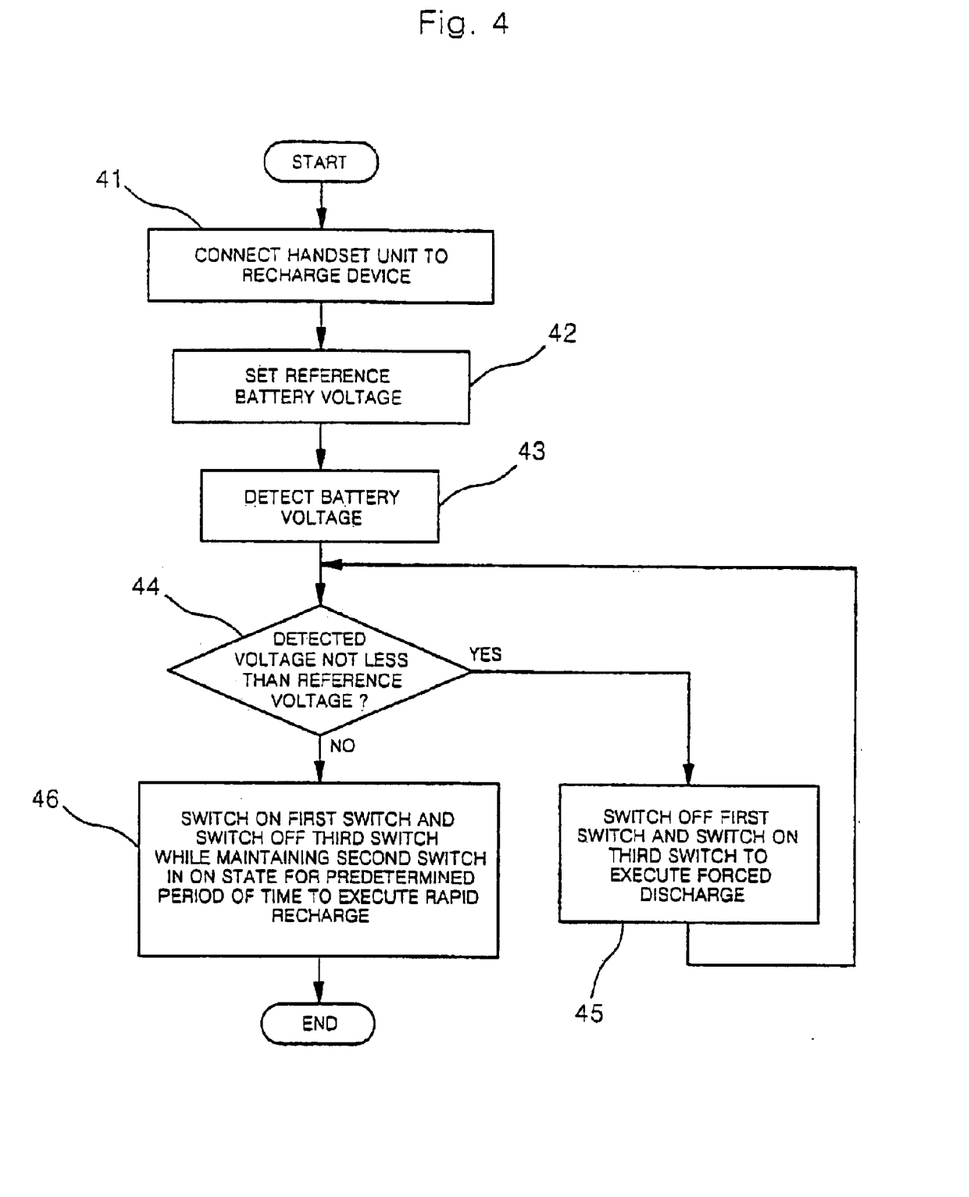
FIG. 4 is a flow chart illustrating sequential steps of a battery capacity recovery method for a wireless telephone in accordance with the present invention.

FIG. 4 is a flow chart illustrating sequential steps of a battery capacity recovery method for a telecommunication device, which is carried out using the battery capacity recovery apparatus of FIG. 2 or FIG. 3 in accordance with the present invention. The handset unit is first connected to the recharge device installed in the base unit for a recharge of the battery (Step 41). A reference voltage is then set by a minimum voltage within a voltage range having no influence on the battery (Step 42). When the voltage of the battery is detected (Step 43), it is determined whether or not the detected battery voltage is not less than the reference voltage (Step 44).

When the battery voltage is not less than the reference voltage, the procedure proceeds to step 45. At step 45, the first switch 51 is switched off, thereby preventing an establishment of the recharge path between the recharge terminals and the battery. Simultaneously, the third switch 53 is switched on, thereby causing the battery to be connected to the ground. Accordingly, the forced discharge path is established to allow a forced discharge operation to be conducted. The procedure is then returned to step 44.

On the other hand, when the battery voltage is less than the reference voltage, the procedure proceeds to step 46. At step 46, the first switch 51 is switched on, and the third switch 53 is switched off. In this state, the recharge path between the recharge terminals and the battery is established. Simultaneously, the second switch 52 is switched on, and maintained in the ON state for a predetermined period of time. Accordingly, a rapid recharge operation is conducted for the predetermined period of time. When the battery voltage, detected after the procedure returns from step 45 to step 44, is less than the reference voltage, step 46 is also executed.

After the rapid recharge operation is completed for the predetermined period of time, the second switch 52 is switched off, and a normal recharge operation is conducted through the recharge path established via the first switch 51 and the resistor. After completing step 46, the procedure is ended.

The first and third switches 51 and 53 operate in an inverted fashion with respect to each other by virtue of the inverter 54. That is, when the first switch 51 is in its ON state to conduct the recharge operation, the third switch 53 is in its OFF state. On the other hand, when the first switch 51 is in its OFF state, the third switch 53 is in its ON state to allow a discharge of the battery to be carried out.

The reference voltage, which is a minimum voltage within a voltage range having no influence on the battery, is set in order to prevent the battery from reaching a state, in which the function of the battery is down, thereby disabling a recharge of the battery, due to an excessive discharge of the battery.

Now, the above mentioned battery capacity recovery apparatus and method will be described in detail, in conjunction with respective embodiments of the present invention. A description will be first made in conjunction with FIG. 5 which is a flow chart illustrating a battery capacity recovery procedure associated with the battery capacity recovery apparatus of FIG. 2.

Figure 5:
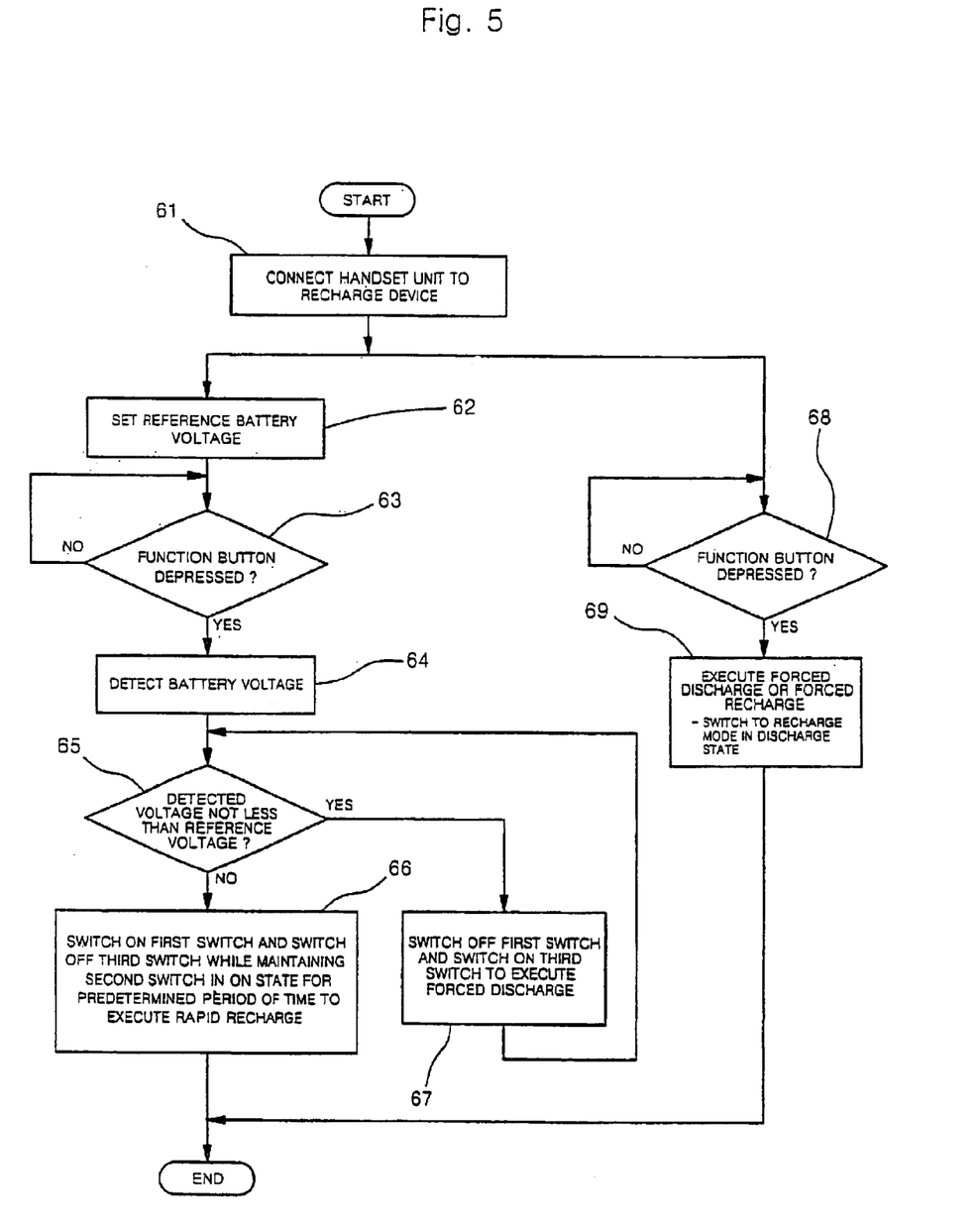
FIG. 5 is a flow chart illustrating a battery capacity recovery method associated with the battery capacity recovery apparatus of FIG. 2.

The user first connects the handset unit to the recharge device (Step 61), and then sets a reference voltage by a minimum voltage within a voltage range having no influence on the battery (Step 62). Thereafter, the user depresses a function button provided at the handset unit for the execution of a battery capacity recovery operation, so as to allow the battery capacity recovery apparatus to conduct the battery capacity recovery operation.

In response to a button input, the control unit 40 then determines whether or not the function button is depressed (Step 63). Detection of the button input may be performed by a detector 90 which, for example, may be included in the control unit 40. When the control unit 40 determines that the function button is depressed, it then determines whether or not the handset unit is in a recharge state, based on a detect signal received from the recharge detecting unit 20 (Step 64). When the control unit 40 determines that the handset unit is in the recharge state, it is then determined whether or not the battery voltage detected by the voltage detecting unit 30 is not less than the reference voltage (Step 65).

When the detected battery voltage is less than the reference voltage, the control unit 40 switches on the first switch 51 and the second switch 52 to execute a rapid recharge mode (Step 66) for a predetermined period of time, the second switch is turned off. Thereafter, in this regular recharge mode, the battery is recharged via the recharge current control resistor because the handset unit is in a state connected to the constant voltage generating unit 10 of the recharge device via the recharge terminals, and the first switch 51 is in its ON state.

On the other hand, where the detected battery voltage is not less than the reference voltage, the control unit 40 switches off the first switch 51 while switching on the third switch 53, thereby executing a forced discharge mode (Step 67). In the forced discharge mode, the control unit 40 frequently checks the voltage condition of the battery, based on a signal received from the voltage detecting unit 30. If the detected battery voltage is reduced to be less than the reference voltage, the control unit 40 switches on the first switch 51 while switching off the third switch 53, thereby switching the operation mode from the forced discharge mode to the rapid and/or regular recharge mode.

In the rapid recharge mode, the second the second switch 52 is switched on, and maintained in the ON state for a predetermined period of time. Accordingly, an initial rapid recharge operation is conducted for the predetermined period of time in order to minimize a possible inconvenience of the user caused by a discharge of the battery.

Alternatively, forced discharge or forced recharge operations of the battery may be carried out just after the user depresses the function button for the execution of the battery capacity recovery operation (Step 68 and 69). In this case, the forced discharge operation is carried out after completion of the recharge operation. These forced discharge and recharge operations are carried out in the same fashion as those of step 45 and 46.

The embodiment of FIG. 2 is implemented using the function button of the keypad 80 which can be depressed by the user. Such a configuration is based on an assumption that may be necessary to carry out the battery capacity recovery function once per one month in the case of batteries currently used.

Figure 6:
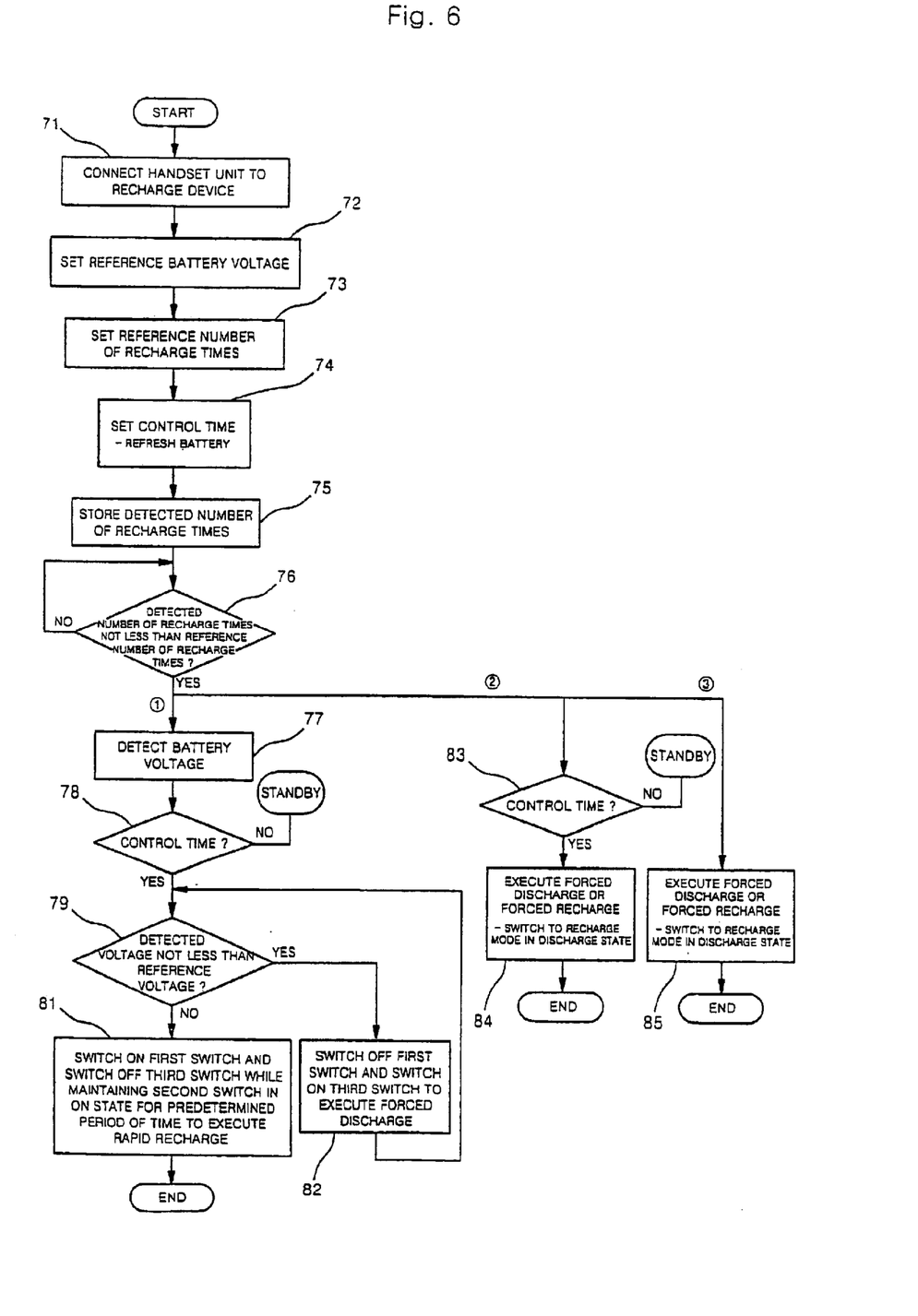
FIG. 6 is a flow chart illustrating a battery capacity recovery method associated with the battery capacity recovery apparatus of FIG. 3.

FIG. 6 is a flow chart illustrating a battery capacity recovery procedure associated with the battery capacity recovery apparatus of FIG. 3. The user first connects the handset unit to the recharge device (Step 71), and then sets a reference voltage by a minimum voltage within a voltage range having no influence on the battery (Step 72). Thereafter, the user sets a reference number of recharge times and a control time for the execution of a battery capacity recovery operation (Steps 73 and 74).

When the user puts the handset unit on the recharge device, the control unit 40 then determines whether or not the handset unit is connected to the recharge device, i.e., whether or not the handset unit is in a recharge state, based on a signal received from the recharge detecting unit 20. When it is determined that the handset unit is in the recharge state, the control unit 40 cumulatively stores the counted number of recharge times in the register unit 60, thereby updating the counted number of recharge times (Step 75). Thereafter, the control unit 40 determines whether or not the counted number of recharge times is not less than the reference number of recharge times (Step 76).

Where it is determined that the counted number of recharge times is not less than the reference number of recharge times, the control unit 40 checks the battery voltage detected by the voltage detecting unit 30 (Step 77). Following step 77, the control unit 40 determines whether or not the current time reaches the control time for the execution of the battery capacity recovery operation (Step 78).

The control unit 40 continuously checks the current time, based on a signal received from the clock unit 70. This checking function may be performed by a time detection unit included in the control unit 40. When the current time corresponds to the control time, the battery capacity recovery operation is executed. On the other hand, when the current time does not reach the control time, the control unit 40 is rendered to be in a standby mode. The control time may be set by a time, at which the telephone is almost unused, for example, during night time. The user may conduct setting of the current time and the control time, that is, the reference recovery time, for example, when the telephone is initially installed.

Where the current time corresponds to the control time, the control unit 40 determines whether or not the detected battery voltage is less than the reference voltage (Step 79). When the detected battery voltage is not less than the reference voltage, the control unit 40 switches off the first switch 51 while switching on the third switch 53, thereby connecting the battery to the ground. As a result, the forced discharge path is established to execute a forced discharge operation (Step 82).

The forced discharge operation is continued until the battery voltage is reduced to a level less than the reference voltage, i.e., the minimum voltage within a voltage range having no influence on the battery. In response to a reduction of the battery voltage to a level less than the reference voltage, the control unit 40 switches on the first switch 51 while switching off the third switch 53, thereby establishing the recharge path between the first switch 51 and the battery. In this state, the second the second switch 52 is also switched on, and maintained in the on state for a predetermined period of time. Accordingly, an initial rapid recharge operation is conducted for the predetermined period of time.

On the other hand, when the detected battery voltage is less than the reference voltage, the control unit 40 switches on the first switch 51 while switching off the third switch 53, thereby establishing the recharge path between the first switch 51 and the battery. In this state, the second switch 52 is also switched on, and maintained in the on state for a predetermined period of time. Accordingly, an initial rapid recharge operation is conducted for the predetermined period of time (Step 81). After the rapid recharge operation is completed as the second switch 52 is switched off, a normal recharge operation is conducted through the recharge path established via the first switch 51 and the resistor. After completing step 81, the procedure is ended.

Alternatively, forced discharge or forced recharge operations of the battery may be carried out, only based on the fact that the counted number of recharge times is not less than the reference number of recharge times (Step 85). Furthermore, the forced discharge and recharge operations may be conducted after determining whether or not the current time corresponds to the control time (Steps 83 and 84). In this case, the forced discharge operation is carried out after completion of the recharge operation. These forced discharge and recharge operations are carried out in the same fashion as those of step 45 and 46, is described with reference to FIG. 4.

As apparent from the above description, the battery capacity recovery apparatus of the present invention is incorporated in a telecommunication device, so that it can prevent a memory effect more frequently resulting in a battery degradation, as compared to those resulting from other factors. In accordance with the battery recovery apparatus and method of the present invention, discharge and recharge operations are carried out by checking signals outputted from the voltage detecting unit and recharge detecting unit, and depressing the function button for the execution of a battery capacity recovery operation in accordance with a manipulation made by the user when the output signals are less than and not less than reference values, respectively. The discharge and recharge operations may be automatically conducted, based on the result of a comparison of the output signals with respective reference values. Accordingly, it is possible to reduce the battery degradation while maximizing the convenience of the user.

Although the preferred embodiments of the invention have been disclosed for illustrative purposes, those skilled in the art will appreciate that various modifications, additions and substitutions are possible, without departing from the scope and spirit of the invention as disclosed in the accompanying claims. Although the switches for forced discharge and recharge operations are incorporated in the handset unit of the wireless telephone, they may be alternatively incorporated in the recharge device. The present invention may also be applied not only to a telecommunication device, but also to any devices, apparatus or systems using rechargeable batteries (in particular, those of the NiCd type).

What is claimed is:

1. A battery management apparatus, comprising:

a control unit which controls at least one of a discharging operation and a recharging operation for a battery of an electronic device; and a counter which counts a number of times the battery has been recharged, wherein said control unit discharges the battery when a count value of the counter equals a predetermined reference value, and wherein after discharging said control unit recharges the battery at a first rate for a predetermined period of time and recharges the battery at a second rate after said predetermined period of time has expired.

2. The battery management apparatus according to claim 1, wherein said control unit discharges the battery when a count value of the counter equals a predetermined reference value and a voltage of the battery is greater than a predetermined reference voltage.

3. The apparatus according to claim 1, wherein said control unit discharges the battery when said a count value of the counter equals said predetermined reference value and a function on the electronic device has been activated.

4. The apparatus according to claim 1, wherein said predetermined reference value is designated by a user.

5. A The battery management apparatus comprising:

a control unit which controls at least one of a discharging operation and a recharging operation for a battery of an electronic device; and a counter which counts a number of times the battery has been recharged, wherein said control unit discharges the battery when a count value of the counter equals a predetermined reference value, wherein said control unit discharges the battery when a count value of the counter equals a predetermined reference value and a detected time equals a control time.

6. A battery management apparatus, comprising:

a control unit which controls at least one of a discharging operation and a recharging operation for a battery of an electronic device; and a time detection unit, wherein said control unit discharges the battery when a time detected by the time detection unit equals a control time, and wherein after discharging said control unit recharges the battery at a first rate for a predetermined period of time and recharges the battery at a second rate after said predetermined period of time has expired.

7. The battery management apparatus according to claim 6, wherein said control unit discharges the battery when a time detected by the time detection unit equals a control time and a number of times the battery has been recharged equals a predetermined reference value.

8. The battery management apparatus according to claim 6, wherein said control unit discharges the battery when a time detected by the time detection unit equals a control time and a voltage of the battery is greater than a predetermined reference voltage.

9. The battery management apparatus according to claim 6, wherein said control unit discharges the battery when a time detected by the time detection unit equals a control time and a function on the electronic device has been activated.

10. The battery management apparatus according to claim 6, wherein said control time is designated by a user.

11. The apparatus of claim 6, wherein the time detection unit is included in the control unit.

12. A battery management apparatus, comprising:

a control unit which controls at least one of a discharging operation and a recharging operation for a battery of an electronic device; and a detection unit which detects whether a function has been activated on the electronic device, wherein said control unit discharges the batter when the detection unit detects that said function has been activated on the electronic device, and wherein after discharging said control unit recharges the battery at a first rate for a predetermined period of time and recharges the battery at a second rate after said predetermined period of time has expired.

13. A method for managing battery operation, comprising:

counting a number of times a battery has been recharged;

discharging the battery when a count value of the counter equals a predetermined reference value; and recharging the battery at a first rate for a predetermined period of time and recharging the battery at a second rate after said predetermined period of time has expired.

14. The method of claim 13, wherein the discharging step includes:

discharging the battery when said count value of the counter equals said predetermined reference value and a voltage of the battery is greater than a predetermined reference voltage.

15. The method of claim 13, wherein the discharging step includes: discharging the battery when said count value of the counter equals said predetermined reference value and a function of an electronic device powered by the battery has been activated.

16. The method of claim 13, wherein said predetermined reference value is designated by a user.

17. A method for managing battery operation, comprising:

counting a number of times a battery has been recharged;

discharging the battery when a count value of the counter equals a predetermined reference value and a detected time equals a control time.

18. A method for managing battery operation, comprising:

comparing a detected time to a control time;

discharging the battery when the detected time equals the control time; and recharging the battery at a first rate for a predetermined period of time and recharging the battery at a second rate after said predetermined period of rime has expired.

19. The method of claim 18, wherein the discharging step includes: detecting a number of times the battery has been recharged; comparing the detected number of times the battery has been recharged to a predetermined reference value; and discharging the battery when the detected rime equals the control time and the detected number of times the battery has been recharged equals said predetermined reference value.

20. The method of claim 18, wherein the discharging step includes:

detecting a voltage of the battery; and discharging the battery when the detected time equals the control time and the detected battery voltage is greater than a predetermined reference voltage.

21. The method of claim 18, wherein the discharging step includes:

determining whether a function of an electronic device powered by the battery has been activated; and discharging the battery when the detected time equals the control time and said function has been activated.

22. The method of claim 18, wherein the control time is designated by a user.

23. A method for managing battery operation, comprising:

recharging a discharged battery of an electronic device at a first rate for a predetermined period of time; and recharging the battery at a second rate after said predetermined period of time has expired.

24. The method of claim 23, further comprising:

performing a discharge operation to discharge the battery.

* * * * *